United States Patent
Niwa et al.

(10) Patent No.: US 12,132,436 B2
(45) Date of Patent: Oct. 29, 2024

(54) STEPPING MOTOR ABNORMALITY DETECTING DEVICE

(71) Applicant: Panasonic Intellectual Property Management Co., Ltd., Osaka (JP)

(72) Inventors: Jumpei Niwa, Nara (JP); Yoshio Horiike, Osaka (JP); Koichi Toyota, Nara (JP); Yukihiro Omoto, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 126 days.

(21) Appl. No.: 17/997,735

(22) PCT Filed: Jun. 18, 2021

(86) PCT No.: PCT/JP2021/023143
§ 371 (c)(1),
(2) Date: Nov. 1, 2022

(87) PCT Pub. No.: WO2021/261387
PCT Pub. Date: Dec. 30, 2021

(65) Prior Publication Data
US 2023/0198433 A1 Jun. 22, 2023

(30) Foreign Application Priority Data
Jun. 25, 2020 (JP) .................. 2020-109221

(51) Int. Cl.
*H02P 8/38* (2006.01)
*H02P 8/12* (2006.01)

(52) U.S. Cl.
CPC . *H02P 8/38* (2013.01); *H02P 8/12* (2013.01)

(58) Field of Classification Search
CPC .................................. H02P 8/38; H02P 8/12
(Continued)

(56) References Cited

U.S. PATENT DOCUMENTS 5,182,507 A * 1/1993 Ishii .................... H02H 7/0844
318/696
5,838,132 A * 11/1998 Tanaka .................. G05B 19/39
318/434
(Continued)

FOREIGN PATENT DOCUMENTS

CN 106150728 9/2019
JP 7-099796 4/1995
(Continued)

OTHER PUBLICATIONS

Extended European Search Report issued Oct. 26, 2023 in corresponding European Patent Application No. 21829688.7.
(Continued)

*Primary Examiner* — David Luo
(74) *Attorney, Agent, or Firm* — Wenderoth, Lind & Ponack, L.L.P.

(57) ABSTRACT

Provided is a stepping motor abnormality detecting device capable of detecting an abnormality of a stepping motor. Stepping motor abnormality detecting device (100) includes power supply (1), stepping motor (4), stepping motor driver (3), determiner (5), and controller (6). Controller (6) causes stepping motor driver (3) to operate stepping motor (4), current level detector (2) to acquire a current level while stepping motor (4) is driven, and determiner (5) to detect the abnormality of stepping motor (4) by comparing the current level acquired with a predetermined threshold.

8 Claims, 6 Drawing Sheets

(58) Field of Classification Search
USPC ................................. 318/434, 685, 671, 560
See application file for complete search history.

(56) References Cited

U.S. PATENT DOCUMENTS

| | | | | |
|---|---|---|---|---|
| 6,476,578 | B2* | 11/2002 | Yoshikawa | ............... H02P 8/34 |
| | | | | 318/696 |
| 7,298,283 | B2* | 11/2007 | Takahashi | ............. H02P 29/025 |
| | | | | 340/661 |
| 9,654,040 | B2* | 5/2017 | Tsuchihashi | .............. H02P 8/36 |
| 2001/0035730 | A1 | 11/2001 | Yoshikawa et al. | |
| 2006/0022837 | A1 | 2/2006 | Takahashi et al. | |

FOREIGN PATENT DOCUMENTS

| | | |
|---|---|---|
| JP | 8-275592 | 10/1996 |
| JP | 11-187697 | 7/1999 |
| JP | 2001-158546 | 6/2001 |
| JP | 2006-118642 | 5/2006 |
| JP | 2015-061341 | 3/2015 |

OTHER PUBLICATIONS

International Search Report of PCT application No. PCT/JP2021/023143 dated Aug. 24, 2021.

\* cited by examiner

STEPPING MOTOR ABNORMALITY DETECTING DEVICE

TECHNICAL FIELD

The present disclosure relates to a device that detects an abnormality in driving of a stepping motor. More particularly, the present disclosure relates to a device that detects an abnormality of a stepping motor employed in a two-way valve for opening and closing a gas flow in a gas meter.

BACKGROUND ART

PTL 1 discloses a shut-off valve device that determines a stall state or a step-out state of a stepping motor.

This shut-off valve device includes a drive control circuit that controls driving of the stepping motor and a valve abnormality circuit that determines a stall state or step-out state of the stepping motor. As illustrated in FIG. 4, the shut-off valve device is capable of determining the stall state or step-out state by comparing a maximum value or a wave height of the maximum value in a drive voltage waveform detected from the stepping motor with a predetermined threshold. FIG. 4 is a graph illustrating a current level change while the stepping motor is driven.

PTL2 discloses a step-out detection method for stepping motors. In the step-out detection method, a motor current waveform in a stepping motor driver that drives the stepping motor is converted into a rectangular wave signal, and this rectangular wave signal is converted into a voltage signal. Then, a voltage value acquired from the voltage signal is compared with a reference voltage to determine occurrence of the step-out state.

CITATION LIST

Patent Literature

PTL 1: Unexamined Japanese Patent Publication No. 2006-118642

PTL 2: Unexamined Japanese Patent Publication No. 1999-187697

SUMMARY OF THE INVENTION

Both PTL1 and PTL2 disclose techniques focused on a difference in current and voltage waveforms between the normal and step-out states. These techniques are capable of detecting a waveform difference in a stable step-out state. However, in a practical operating environment, the stepping motor often repeats unstable behavior such as slight rotation or return. In such case, the waveform difference becomes unclear and it becomes difficult to distinguish between the normal and step-out states.

The present disclosure provides a stepping motor abnormality detecting device that is capable of correcting a waveform detected in an unstable state to reliably detect an abnormality of the stepping motor.

The stepping motor abnormality detecting device of the present disclosure includes an instantaneous current level detector, an integrator, and a determiner. The instantaneous current level detector acquires a reference current of the stepping motor. The integrator generates an average drive current. The determiner compares the average drive current with a predetermined threshold based on the reference current, and determines the abnormality of the stepping motor.

The present disclosure provides the stepping motor abnormality detecting device capable of detecting the abnormality of the stepping motor even in the unstable operating environment.

DESCRIPTION OF EMBODIMENT

Exemplary embodiments will be detailed below with reference to the drawings. However, detailed description more than necessary may be omitted. For example, details of broadly-known facts or duplicate description of substantially the same structure may be omitted. This is to prevent the following description from becoming redundant more than necessary and facilitate understanding of those skilled in the art.

The attached drawings and the following description are provided to enable those skilled in the art to sufficiently understand the present disclosure, and do not intend to limit the subject matters in the scope of claims.

First Exemplary Embodiment

The first exemplary embodiment will be described below with referent to FIG. 1 to FIG. 6.

1-1. Configuration

1-1-1. Configuration of Abnormality Detecting Device

Figure 1:
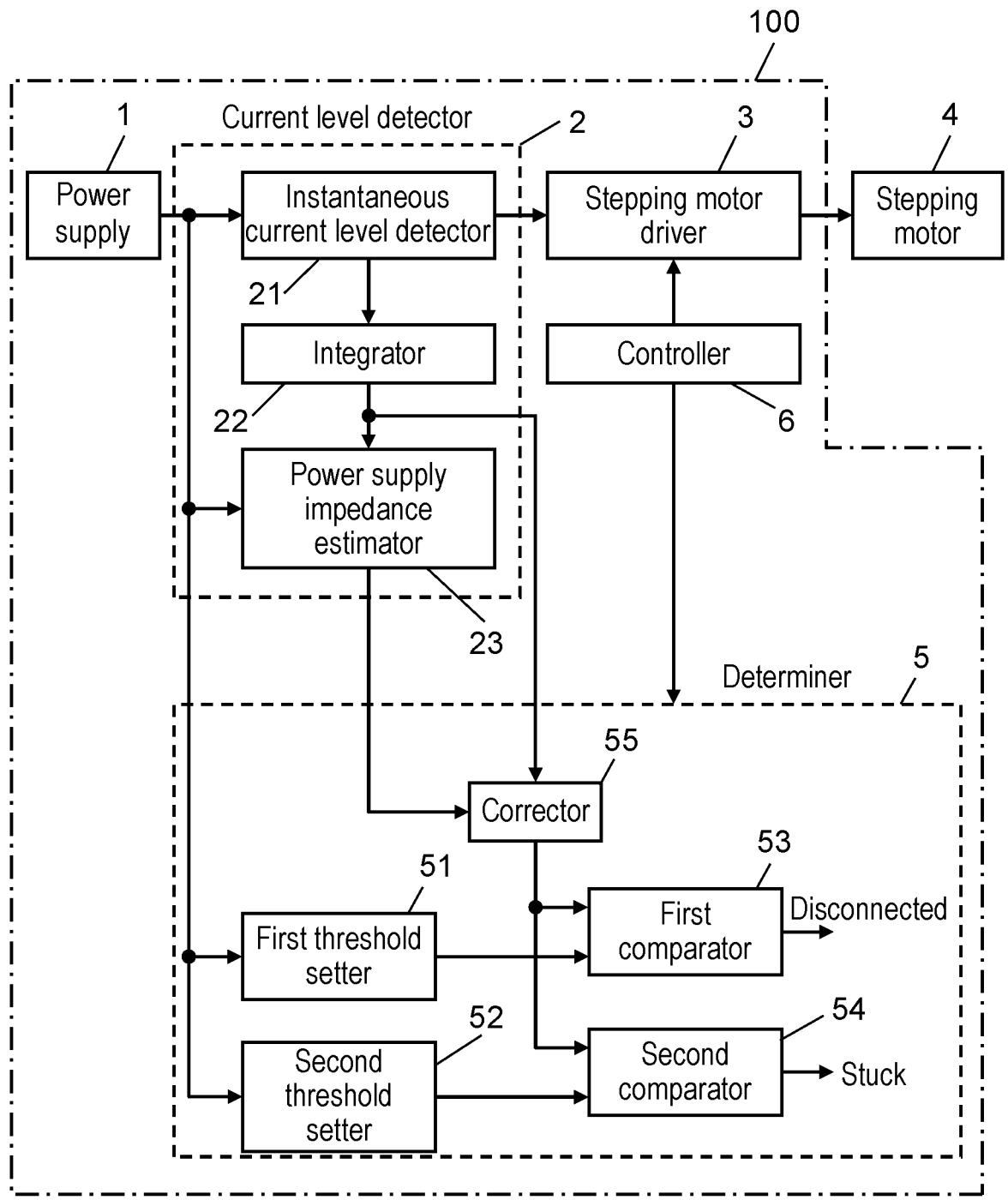
FIG. 1 is a block diagram illustrating an example of a configuration of a stepping motor abnormality detecting device according to a first exemplary embodiment.

FIG. 1 is a block diagram of an example of a configuration of stepping motor abnormality detecting device 100 according to the first exemplary embodiment. As illustrated in FIG. 1, stepping motor 4 is connected to stepping motor driver 3. Stepping motor driver 3 is connected to power supply 1 via current level detector 2. Current level detector 2 is also connected to determiner 5. Determiner 5 and stepping motor driver 3 are connected to controller 6 and controlled by controller 6.

Power supply 1 is configured by connecting a plurality of primary lithium batteries (not illustrated) in parallel. Power supply 1 has a battery capacity equivalent to a current capacity consumed by an electrical system within a validity period of verification. The validity period is, for example, 15 years.

Current level detector 2 has instantaneous current level detector 21 that detects a current level of instantaneous current flowing in stepping motor driver 3. Current level detector 2 further includes integrator 22 that integrates the current level detected, and power supply impedance estimator 23 that estimates impedance of power supply 1 (hereinafter referred to as power supply impedance).

Stepping motor driver 3 is controlled by controller 6, and outputs a drive pulse for driving stepping motor 4 to drive stepping motor 4.

When stepping motor 4 is employed in a gas meter, stepping motor 4 is regarded as a valve for controlling a gas flow rate. In this case, stepping motor 4 performs two types of operation: a shut-off operation to shut off gas and a return operation to release the gas shut-off operation.

Determiner 5 includes corrector 55. Corrector 55 uses the power supply impedance acquired by power supply impedance estimator 23 to correct the current level detected by instantaneous current level detector 21 and integrated by integrator 22. Still more, determiner 5 includes first comparator 53 and second comparator 54. Each of first comparator 53 and second comparator 54 compares the current level corrected by corrector 55 with a predetermined determination threshold. The determination threshold used in first comparator 53 is set by first determination threshold setter 51. The determination threshold used in second comparator 54 is set by second determination threshold setter 52.

Controller 6 controls stepping motor driver 3. Controller 6 performs the shut-off and return operations of the gas meter by operating stepping motor 4 via stepping motor driver 3. Still more, controller 6 retains timing information that specifies timing to detect the current level by current level detector 2. Furthermore, controller 6 stores a determination result acquired by determiner 5.

1-1-2. Configuration of Current Level Detector

Figure 2:
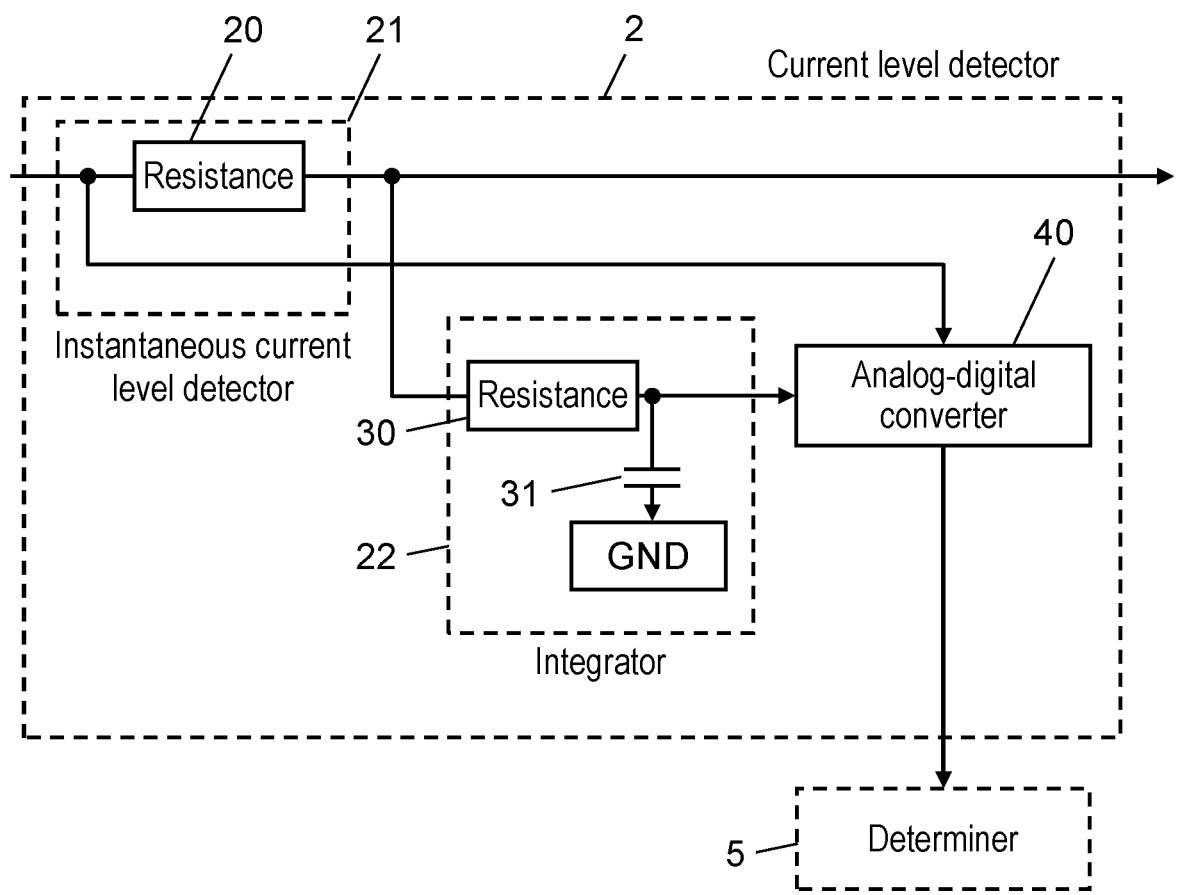
FIG. 2 is a block diagram illustrating an example of a configuration of a current level detector according to the first exemplary embodiment.

FIG. 2 is a block diagram illustrating an example of a configuration of current level detector 2 according to the first exemplary embodiment.

Instantaneous current level detector 21 has resistance 20.

Integrator 22 integrates the current flowing from resistance 20 to stepping motor driver 3 by resistance 30 and capacitor 31. Capacitor 31 is connected to ground (GND).

Analog-digital converter 40 has a function to convert a current level of input current from an analog value to a digital value. More specifically, using an output voltage of power supply 1 as a reference voltage, voltage acquired by integrating current flowing in resistance 20 by integrator 22 is converted into a digital value. Accordingly, the smaller the digital value is, the larger the current is. In the present exemplary embodiment, this digital value is regarded as the current level. The converted digital value is output to determiner 5, and determiner 5 uses this digital value for determination. Analog-digital converter 40 also functions as power supply impedance estimator 23.

1-2. Operation

The operation of stepping motor abnormality detecting device 100 as configured above will be described below. In stepping motor abnormality detecting device 100, instantaneous current level detector 21 acquires a current level while stepping motor 4 is driven. Then, corrector 55 corrects the current level using the power supply impedance estimated by power supply impedance estimator 23. Then, first comparator 53 and second comparator 54 compare the current level after correction with the predetermined determination thresholds, and determiner 5 determines abnormality of the stepping motor. The operation will be detailed below.

1-2-1. Current Level Acquisition

Current level detector 2 retains the timing information that specifies timing to detect the current level. Current level detector 2 acquires the current level at a predetermined timing, based on the timing information, while stepping motor 4 is driven. More specifically, controller 6 controls stepping motor driver 3 to drive stepping motor 4. While stepping motor 4 is driven, analog-digital converter 40 converts the current level acquired by instantaneous current level detector 21 into a digital value. A timing that analog-digital converter 40 acquires the digital value can be arbitrary set. However, the timing is limited to while stepping motor 4 is driven. The number of times that analog-digital converter 40 acquires the digital value is not limited to once. For example, analog-digital converter 40 can calculate an average by acquiring the digital value more than once to prevent faulty determination typically due to noise.

1-2-1. Correction

Figure 4:
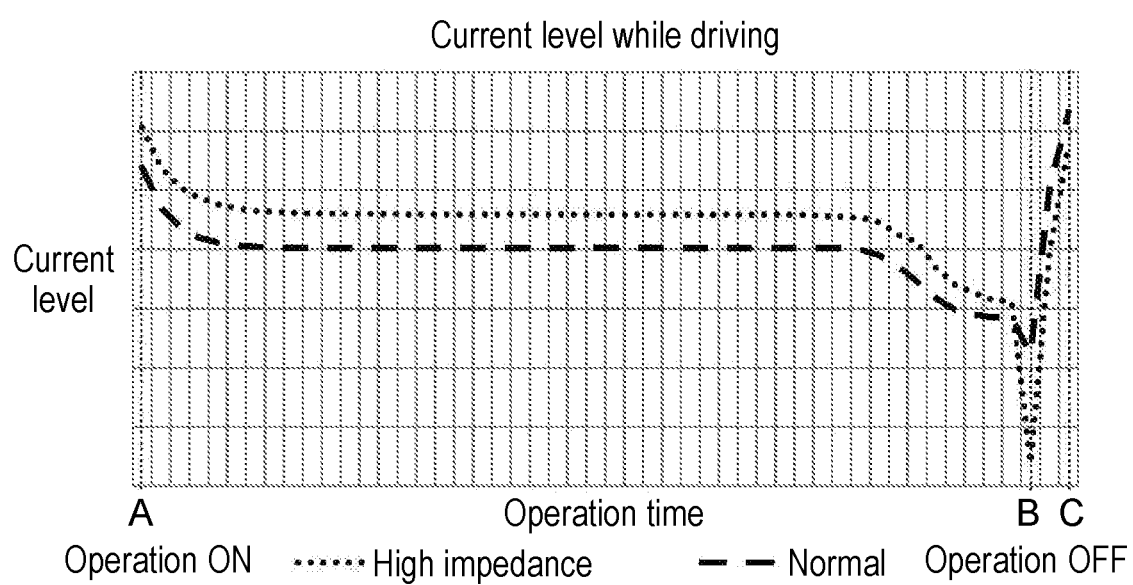
FIG. 4 is a graph illustrating a current level change while the stepping motor is driven.

In FIG. 4, a current level change is illustrated according to a difference in power supply impedance while stepping motor 4 is driven when stepping motor 4 is employed for driving a shut-off valve. FIG. 4 illustrates the current level change in a period when stepping motor driver 3 is turned ON at timing A to change the shut-off vale from a full open state to a full close state by closing the shut-off valve until stepping motor driver 3 is turned OFF at timing B after the rotation of stepping motor 4 is stopped. In FIG. 4, the current level is the digital value as described above.

In FIG. 4, the current level change immediately before timing B indicates that a load has increased due to stopping of the rotation of stepping motor 4. Still more, FIG. 4 indicates that the current level is higher, compared with the current level in the normal state, when the impedance is high. Accordingly, it can be confirmed that the current flow is increased by increased internal impedance of the lithium batteries configuring power supply 1 due to temperature change and decreased battery capacity.

The current level is acquired by converting instantaneous current flowing in stepping motor driver 3 into voltage, using resistance 20. The current level detected is divided by a voltage value of power supply 1 and then the result is multiplied by 1024. In other words, when stepping motor 4 is not operating, the detected current level and the voltage value of power supply 1 are equivalent, and thus the calculated current level becomes 1024. In FIG. 4, the current level change from timing B to timing C indicates a state that the current level gradually reaches 1024 by the action of integrator 22 after current consumption of stepping motor 4 becomes 0 at timing B.

Stepping motor abnormality detecting device 100 acquires the power supply impedance by power supply impedance estimator 23 at a moment between operation ON and OFF. More specifically, the power supply impedance is calculated by acquiring a difference between the upper limit of current level, i.e., 1024, and the current level detected at each timing of operation ON (timing A) and operation OFF (timing B). As illustrated in FIG. 4, when the power supply impedance is high, the aforementioned difference becomes small at operation ON and large at operation OFF. Corrector 55 corrects the current level according to the power supply impedance acquired by power supply impedance estimator 23.

As described above, in current level detector 2, analog-digital converter 40 converts the current flowing at the predetermined timing while stepping motor is driven into the current level indicated by the digital value. Corrector 55 uses the power supply impedance acquired by power supply impedance estimator 23 to correct the current level acquired by integrator 22 to the current level used for abnormality determination.

Figure 5:
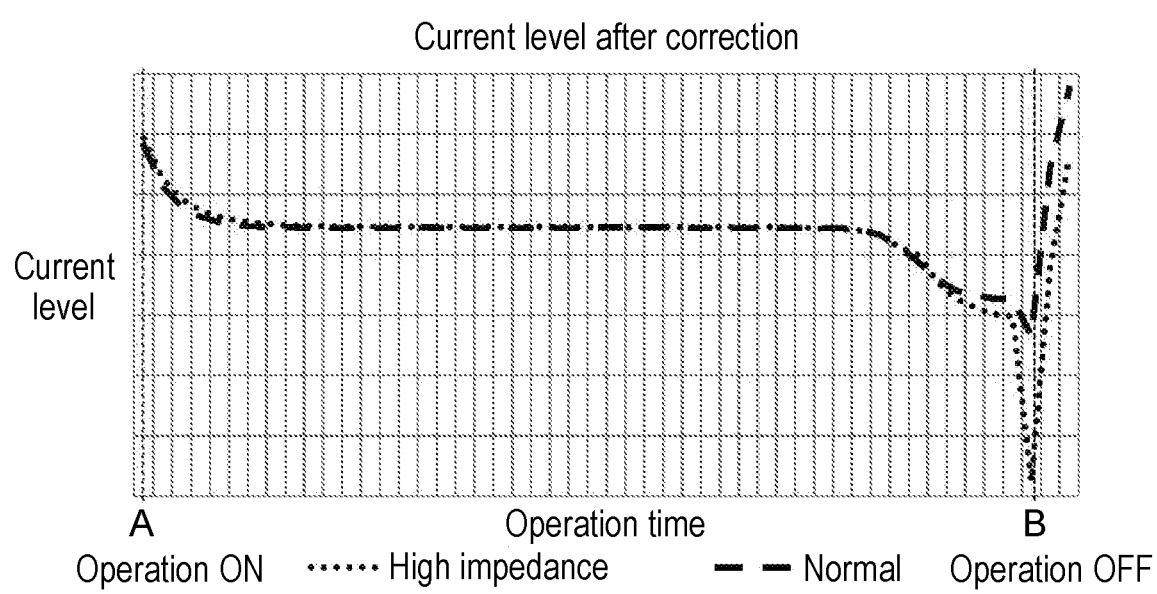
FIG. 5 is a graph illustrating a current level after correcting the current level by a corrector while the stepping motor is driven according to the first exemplary embodiment.

FIG. 5 is a graph illustrating the current level after correcting the current level illustrated in FIG. 4 by corrector 55. In FIG. 4, it can be confirmed that an absolute value of the current level is large at operation ON and during the operation of the stepping motor, and an absolute value of the current level is small at operation OFF. By performing correction described above, the current level change due to power supply impedance can be converted in to a constant current level change. This can significantly reduce faulty determination by determiner 5 described later due to variation in power supply impedance. As a result, high precision abnormality detection can be achieved.

1-2-1. Threshold and Comparison

Figure 3:
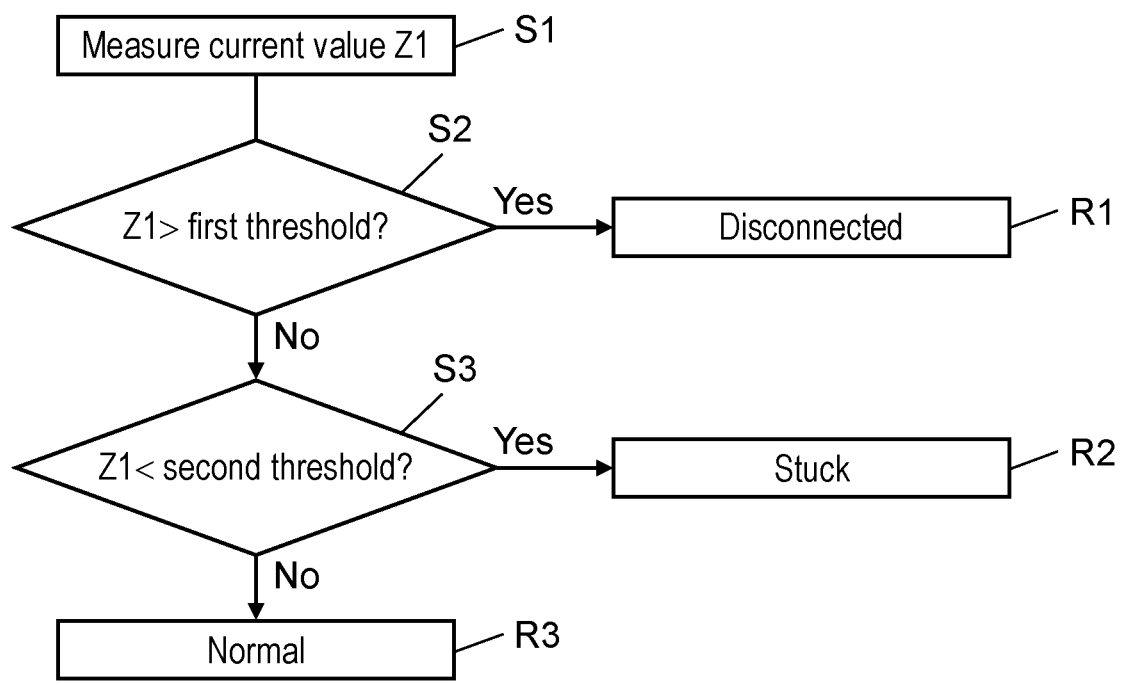
FIG. 3 is a flow chart illustrating an operation of a determiner according to the first exemplary embodiment.

FIG. 3 is a flow chart illustrating an abnormality determining method in determiner 5 according to the first exemplary embodiment.

Figure 6:
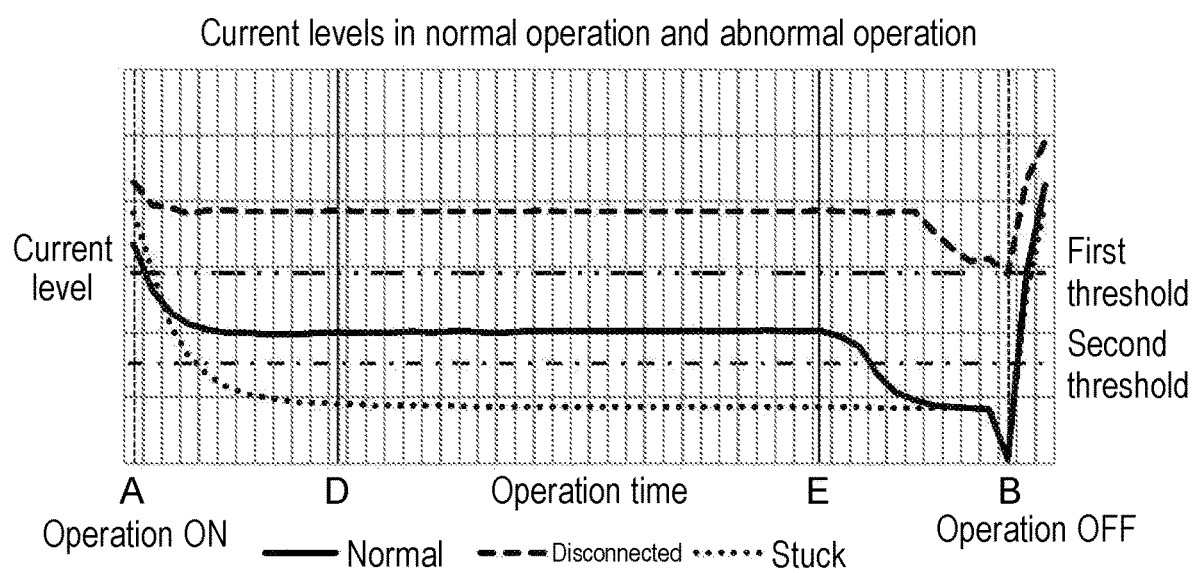
FIG. 6 is a graph illustrating a current level during normal operation and a current level during abnormal operation of the stepping motor.

FIG. 6 is a graph illustrating the current level of stepping motor 4 during the normal operation, the current level of stepping motor during abnormal operation (disconnection), the current level of stepping motor 4 in a step-out or stuck state, a first threshold (first determination threshold), and a second threshold (second determination threshold).

As illustrated in FIG. 3, stepping motor abnormality detecting device 100 first detects current level Z1 corrected at the predetermined timing while the stepping motor is driven (Step S1). In the present exemplary embodiment, the predetermined timing is set in a period between point D and point E in FIG. 6 where the current level is stable. Next, first comparator 53 compares current level Z1 with the first threshold (Step S2). In Step S2, when current level Z1 is determined to be greater than the first threshold (Yes in Step S2), determiner 5 determines that stepping motor 4 is disconnected (R1). On the other hand, when current level Z1 is determined to be equal to or lower than the first threshold in Step S2 (No in Step S2), second comparator 54 compares current level Z1 with the second threshold (Step S3). In Step S3, when current level Z1 is determined to be less than the second threshold (Yes in Step S3), determiner 5 determines that stepping motor 4 is in the step-out or stuck state (R2). When no abnormality is determined through comparison of current level Z1 with the first threshold and the second threshold (No in Step S3), determiner 5 determines that stepping motor 4 is normally operated (R3). Note that processes in Step S2 and Step S3 may be performed in a reverse order in the flow chart illustrated in FIG. 3.

1-3. Effects

As described above, stepping motor abnormality detecting device 100 in the first exemplary embodiment includes power supply 1, current level detector 2, stepping motor driver 3, and determiner 5. Current level detector 2 detects the current level of the instantaneous current flowing from power supply 1 to stepping motor driver 3, and integrates the instantaneous current level detected to estimate the power supply impedance. Determiner 5 corrects the integrated value, using the power supply impedance, and compares the corrected value with the predetermined thresholds.

Accordingly, even during the unstable operation, stepping motor abnormality detecting device 100 is capable of detecting the abnormal operation, such as disconnection and sticking, of the stepping motor at high precision without being affected by the unstable operation of the stepping motor because the current level is corrected according to the power supply impedance.

The exemplary embodiment refers to the example of operation in which the current level is detected in a period at the stable current level. However, a current level detection timing is not limited to the period at the stable current level. Even in a period that the current level changes, stepping motor abnormality detecting device 100 is capable of detecting the abnormality of the stepping motor by setting the first threshold and the second threshold to values that can determine abnormality.

In the exemplary embodiment, stepping motor abnormality detecting device 100 may input only the current level of the current flowing in stepping motor driver 3 to analog-digital converter 40 without using instantaneous current level detector 21 and integrator 22.

Note that the above exemplary embodiments are merely examples of the technique of the present disclosure, and all changes, replacements, additions, omissions, and the like which come within the range of equivalency of the claims are therefore intended to be embraced therein.

INDUSTRIAL APPLICABILITY

The present disclosure is applicable to battery equipment employing a stepping motor, and more particularly to water meters.

REFERENCE MARKS IN THE DRAWINGS

1: power supply
2: current level detector
3: stepping motor driver
4: stepping motor
5: determiner
6: controller
20: resistance
30: resistance
31: capacitor
40: analog-digital converter
100: stepping motor abnormality detecting device

The invention claimed is:

1. A stepping motor abnormality detecting device comprising:
a stepping motor driver configured to output a drive pulse for driving a stepping motor;
a power supply configured to supply power to the stepping motor driver;
a current level detector configured to detect a current level of current flowing in the stepping motor driver; and
a determiner configured to determine whether or not the stepping motor is in a normal operation state by comparing the current level detected by the current level detector with a determination threshold predetermined based on a current level when the stepping motor operates normally, wherein
the current level detector includes a power supply impedance estimator that estimates power supply impedance of the power supply, and the determination threshold or the current level is corrected based on the power supply impedance estimated.

2. The stepping motor abnormality detecting device of claim 1, wherein
the determiner has a first determination threshold as the determination threshold, the first determination threshold being used for determining a disconnected state of the stepping motor.

3. The stepping motor abnormality detecting device of claim 1, wherein
the determiner has a second determination threshold as the determination threshold, the second determination threshold being used for determining a stuck state of the stepping motor.

4. The stepping motor abnormality detecting device of claim 1, wherein
the current level detector is configured with an integrator that integrates a current level of an instantaneous current.

5. The stepping motor abnormality detecting device of claim 4, wherein
the current level detector is configured by inserting resistance between the power supply and the stepping motor driver, and
the integrator is configured to integrate a signal at a connection point of the resistance and the stepping motor driver by a capacitor via the resistance.

6. The stepping motor abnormality detecting device of claim 1, wherein
the current level detector includes an analog-digital converter that converts the current level into a digital signal corresponding to the current level.

7. The stepping motor abnormality detecting device of claim 1, wherein
the power supply impedance estimator estimates larger power supply impedance as an output voltage difference of the power supply increases between operation ON and operation OFF of the stepping motor driver.

8. The stepping motor abnormality detecting device of claim 7, wherein
the output voltage difference of the power supply between the operation ON and the operation OFF of the stepping motor driver is a ratio of an output voltage of the power supply to an output from the integrator after the stepping motor driver changes from the operation ON to the operation OFF.

* * * * *